(12) United States Patent
Grigsby et al.

(10) Patent No.: US 8,234,287 B2
(45) Date of Patent: Jul. 31, 2012

(54) SORTING RECORDS BASED ON FREE TEXT FIELD CONTENT

(75) Inventors: Travis M. Grigsby, Austin, TX (US); Frank L. Jania, Chapel Hill, NC (US); Lisa S. Deluca, San Francisco, CA (US)

(73) Assignee: International Business Machines Corporation, Armonk, NY (US)

(*) Notice: Subject to any disclaimer, the term of this patent is extended or adjusted under 35 U.S.C. 154(b) by 482 days.

(21) Appl. No.: 12/236,812

(22) Filed: Sep. 24, 2008

(65) Prior Publication Data
US 2010/0082645 A1 Apr. 1, 2010

(51) Int. Cl.
*G06F 17/30* (2006.01)
*G06F 17/00* (2006.01)
(52) U.S. Cl. .............. 707/752; 707/753; 704/8
(58) Field of Classification Search .......... 707/752–753; 704/8
See application file for complete search history.

(56) References Cited

U.S. PATENT DOCUMENTS

| 5,231,581 | A | * | 7/1993 | Garneau et al. | 704/8 |
| 5,799,303 | A | * | 8/1998 | Tsuchimura | 1/1 |
| 6,928,438 | B2 | * | 8/2005 | Daray et al. | 1/1 |
| 7,702,611 | B2 | * | 4/2010 | Chi et al. | 707/999.001 |
| 7,734,671 | B1 | * | 6/2010 | Ferguson | 707/753 |

* cited by examiner

*Primary Examiner* — Yicun Wu
(74) *Attorney, Agent, or Firm* — Law Office of Jim Boice

(57) ABSTRACT

Disclosed are a method, system and computer program product for sorting records based on content in a free text field. A request is received by a sort function to sort a free text field. The sort function request is intercepted. The content in the free text field is analyzed. One or more new focus words are identified by the analysis. The new focus words are used to sort the free text field. The focus words in the free text field are highlighted and sorted alphabetically. Sorted free text field results based on the new focus words are displayed to a user on the user's display.

15 Claims, 4 Drawing Sheets

200

| SENDER 201 | SUBJECT 202 | DATE 203 |
|---|---|---|
| Gerry | Hey, Lets get lunch tomorrow | 02/19/2008 02:34 PM |
| Alice | TPS report coversheets | 02/19/2008 02:35 PM |
| Helen | Websphere PMR database will be down | 02/19/2008 02:36 PM |
| Eugene | Please read the manual | 02/19/2008 02:37 PM |
| Inbal | I have new specs for the Sonar project | 02/19/2008 02:38 PM |
| Karen | TPS reports, who hates them? | 02/19/2008 02:39 PM |
| Bob | Bathroom fixtures | 02/19/2008 02:40 PM |
| Fred | Tips for creating dummy text | 02/19/2008 02:41 PM |
| Jerry | Nigerian PRINCE Needs Your Help! | 02/19/2008 02:42 PM |
| Clarice 204 | My TPS report is missing supplier data 205 | 02/19/2008 02:43 PM |
| David | Holy Moly | 02/19/2008 02:44 PM |

| SENDER 301 | SUBJECT 302 | DATE 303 |
|---|---|---|
| Alice | TPS report coversheets | 02/19/2008 02:35 PM |
| Bob | Bathroom fixtures | 02/19/2008 02:40 PM |
| Clarice 304 | My TPS report is missing supplier data | 02/19/2008 02:43 PM |
| David | Holy Moly | 02/19/2008 02:44 PM |
| ... | ... | ... |

| SENDER 401 | SUBJECT 402 | DATE 403 |
|---|---|---|
| Bob | Bathroom fixtures | 02/19/2008 02:40 PM |
| Gerry | Hey, Lets get lunch tomorrow | 02/19/2008 02:34 PM |
| David | Holy Moly | 02/19/2008 02:44 PM |
| Inbal | I have new specs for the Sonar project | 02/19/2008 02:38 PM |
| Clarice 404 | My TPS report is missing supplier data | 02/19/2008 02:43 PM |
| Jerry | Nigerian PRINCE Needs Your Help! | 02/19/2008 02:42 PM |
| Eugene | Please read the manual | 02/19/2008 02:37 PM |
| Fred | Tips for creating dummy text | 02/19/2008 02:41 PM |
| Alice | TPS report coversheets | 02/19/2008 02:35 PM |
| Helen | Websphere PMR database will be down | 02/19/2008 02:36 PM |
| Karen | Who hates TPS reports? | 02/19/2008 02:39 PM |

| SENDER 501 | SUBJECT 502 | DATE 503 |
|---|---|---|
| Alice | TPS report coversheets | 02/19/2008 02:35 PM |
| Fred | Tips for creating dummy text | 02/19/2008 02:41 PM |
| Bob | Bathroom fixtures | 02/19/2008 02:40 PM |
| Karen | Who hates TPS reports? | 02/19/2008 02:39 PM |
| Gerry | Hey, Lets get lunch tomorrow | 02/19/2008 02:34 PM |
| Eugene | Please read the manual | 02/19/2008 02:37 PM |
| David | Holy Moly | 02/19/2008 02:44 PM |
| Jerry | Nigerian PRINCE Needs Your Help! | 02/19/2008 02:42 PM |
| Inbal | I have new specs for the Sonar project | 02/19/2008 02:38 PM |
| Clarice 504 | My TPS report is missing supplier data | 02/19/2008 02:43 PM |
| Helen | Websphere PMR database will be down | 02/19/2008 02:36 PM |

| SENDER 601 | SUBJECT 602 | DATE 603 |
|---|---|---|
| Alice | TPS report coversheets | 02/19/2008 02:35 PM |
| Alice | Re: TPS report coversheets | 02/19/2008 05:15 PM |
| Alice | Fwd: TPS report coversheets | 02/19/2008 05:45 PM |
| Fred | Tips for creating coversheets text | 02/19/2008 02:41 PM |

SORTING RECORDS BASED ON FREE TEXT FIELD CONTENT

BACKGROUND

1. Technical Field

The present invention generally relates to computer systems and in particular to enabling a sort function to sort records based on content in a free text field.

2. Description of the Related Art

Current database and spreadsheet applications allow users to sort records on any column. In many cases, the column that is sorted helps a user view new patterns in the data. However, for certain columns, such as free text fields (especially free text fields populated without any structure, like email message subject fields), current sorting methods will most likely not show off any useful patterns. Current sorting methods sort records by date, sender, or subject. While sorting by date or sender is useful, current methods of sorting by subject (i.e., free text field) in a normal database, such as an email database, are not as useful.

SUMMARY OF ILLUSTRATIVE EMBODIMENTS

Disclosed are a method, system and computer program product for sorting records based on content in a free text field. A request is received by a sort function to sort a free text field. The sort function request is intercepted. The content in the free text field is analyzed. One or more new focus words are identified by the analysis. The new focus words are used to sort the free text field. The focus words in the free text field are highlighted and sorted alphabetically. Sorted free text field results based on the new focus words are displayed to a user on the user's display.

The above as well as additional features and advantages of the present invention will become apparent in the following detailed written description.

BRIEF DESCRIPTION OF THE DRAWINGS

The invention itself will best be understood by reference to the following detailed description of an illustrative embodiment when read in conjunction with the accompanying drawings, wherein:

FIG. 2 illustrates a prior art example of an email database sorted by date;

FIG. 3 illustrates a prior art example of an email database sorted by sender;

FIG. 4 illustrates a prior art example of an email database sorted by subject (i.e. free text field);

FIG. 5 illustrates an example of an email database sorted by subject (i.e. free text field) using new focus words produced by an analysis of free text field content, in accordance with one embodiment of the invention;

FIG. 6 illustrates an example of an email database sorted by subject (i.e. free text field) using new primary focus words and new secondary focus words produced by an analysis of free text field content, in accordance with one embodiment of the invention.

DETAILED DESCRIPTION OF AN ILLUSTRATIVE EMBODIMENT

Figure 1:
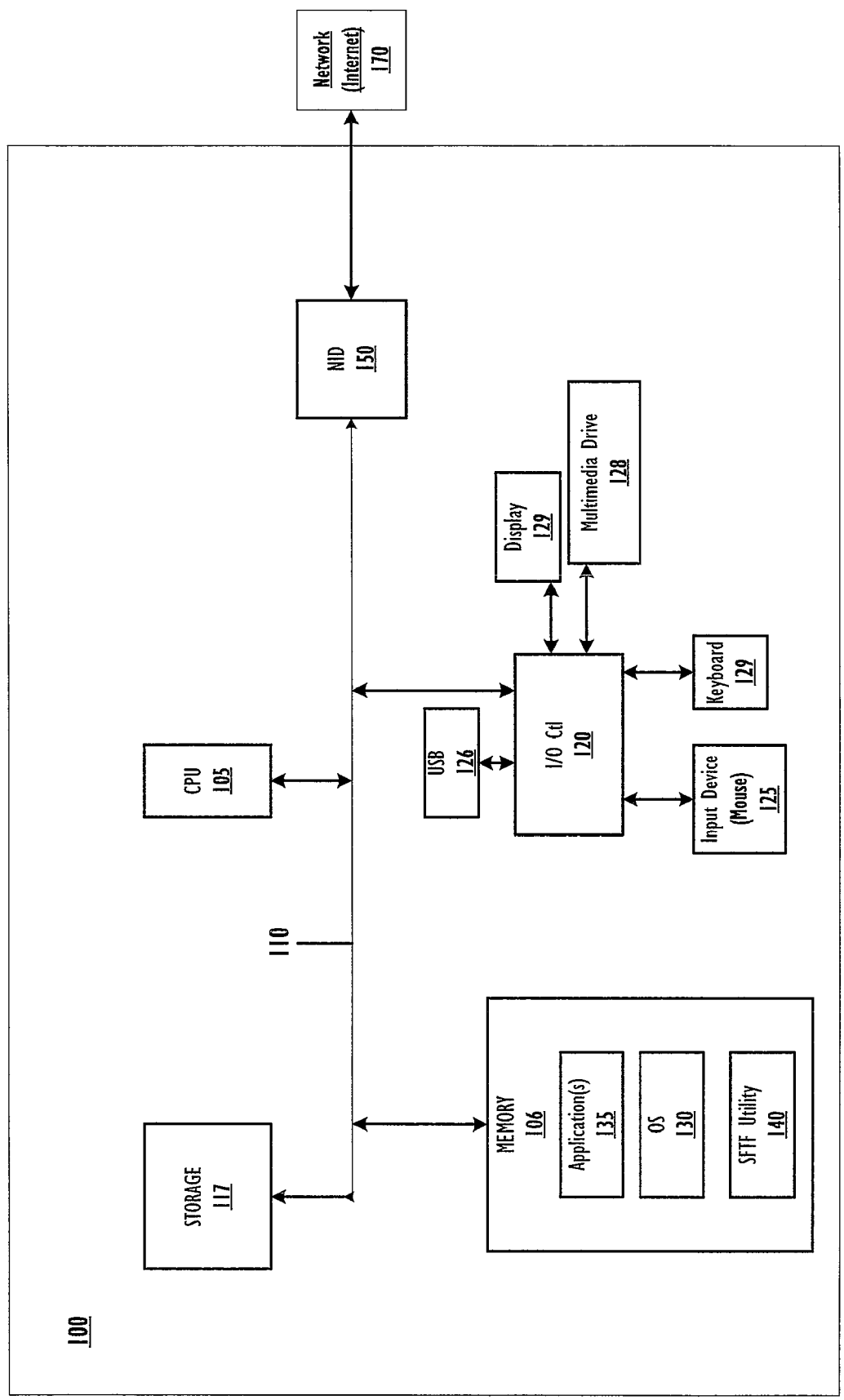
FIG. 1 is a block diagram of a data processing system configured with hardware and software components for implementing one or more embodiments of the invention.

The illustrative embodiments provide a method, system and computer program product for sorting records based on content in a free text field. A request is received by a sort function to sort a free text field. The sort function request is intercepted. The content in the free text field is analyzed. One or more new focus words are identified by the analysis. The new focus words are used to sort the free text field. The focus words in the free text field are highlighted and sorted alphabetically. Sorted free text field results based on the new focus words are displayed to a user on the user's display.

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined only by the appended claims.

Within the descriptions of the figures, similar elements are provided similar names and reference numerals as those of the previous figure(s). Where a later figure utilizes the element in a different context or with different functionality, the element is provided a different leading numeral representative of the figure number. The specific numerals assigned to the elements are provided solely to aid in the description and not meant to imply any limitations (structural or functional) on the invention.

It is understood that the use of specific component, device and/or parameter names are for example only and not meant to imply any limitations on the invention. The invention may thus be implemented with different nomenclature/terminology utilized to describe the components/devices/parameters herein, without limitation. Each term utilized herein is to be given its broadest interpretation given the context in which that terms is utilized.

With reference now to the figures, FIG. 1 depicts a block diagram representation of a data processing system (and connected network). DPS 100 comprises at least one processor or central processing unit (CPU) 105 connected to system memory 106 via system interconnect/bus 110. System memory 106 is defined as a lowest level of volatile memory, including, but not limited to, cache memory, registers, and buffers. Also connected to system bus 110 is I/O controller 120, which provides connectivity and control for input devices, of which pointing device (or mouse) 125 and keyboard 127 are illustrated, and output devices, of which display 129 is illustrated. Additionally, a multimedia drive 128 (e.g., CDRW or DVD drive) and USB (universal serial bus) port 126 are illustrated, coupled to I/O controller. Multimedia drive 128 and USB port 126 may operate as both input and output (storage) mechanisms. DPS 100 also comprises storage 117, within which data/instructions/code may be stored.

DPS 100 is also illustrated with network interface device (NID) 150 coupled to system bus 110. NID 150 enables DPS 100 to connect to one or more access networks 170, such as the Internet.

Notably, in addition to the above described hardware components of DPS 100, various features of the invention are completed via software (or firmware) code or logic stored within memory 106 or other storage (e.g., storage 117) and executed by CPU 105. In one embodiment, data/instructions/ code from storage 117 populates the system memory 106, which is also coupled to system bus 110. Thus, illustrated within memory 106 are a number of software/firmware components, including operating system (OS) 130 (e.g., Microsoft Windows®, a trademark of Microsoft Corp, or GNU®/Linux®, registered trademarks of the Free Software Foundation and The Linux Mark Institute, or Advanced Interactive eXecutive—AIX—, registered trademark of International Business Machines—IBM), applications 135, and Sorting Free Text Field (SFTF) utility 140. A webpage can be viewed on a display 129 of the DPS 100.

In actual implementation, applications 135 and SFTF utility 140 may be combined as a single application collectively providing the various functions of each individual software component when the corresponding code is executed by the CPU 105. For simplicity, SFTF utility 140 is illustrated and described as a stand alone or separate software/firmware component, which is stored in system memory 106 to provide/support the specific novel functions described herein.

CPU 105 executes SFTF utility 140 as well as OS 130, which supports the user interface features of SFTF utility 140. In the illustrative embodiment, SFTF utility 140 generates/provides several graphical user interfaces (GUI) to enable user interaction with, or manipulation of, the functional features of the utility (140). Among the software code/instructions provided by SFTF utility 140, and which are specific to the invention, are: (a) code for receiving a request by a sort function to sort a free text field; (b) code for intercepting a sort function request; (c) code for analyzing content in the free text field; (d) code for identifying one or more new focus words; (e) code for highlighting the new focus words; (f) code for sorting the new focus words alphabetically; and (g) code for displaying the sorted free text field results based on the new focus words. For simplicity of the description, the collective body of code that enables these various features is referred to herein as SFTF utility 140. According to the illustrative embodiment, when CPU 105 executes SFTF utility 140, DPS 100 initiates a series of functional processes that enable the above functional features as well as additional features/functionality, which are described below within the description of FIGS. 5-7.

Those of ordinary skill in the art will appreciate that the hardware and basic configuration depicted in FIG. 1 may vary. For example, other devices/components may be used in addition to or in place of the hardware depicted. The depicted example is not meant to imply architectural limitations with respect to the present invention. The data processing system depicted in FIG. 1 may be, for example, an IBM eServer pSeries system, a product of International Business Machines Corporation in Armonk, N.Y., running the Advanced Interactive Executive (AIX) operating system or LINUX operating system.

FIGS. 2, 3, and 4 are prior art figures showing an email database with records sorted using a current art standard sort by date field, sender field, and subject field (i.e. free text field), respectively. In FIGS. 2, 3, and 4, a date field 203, 303, 403 is a right hand vertical column showing dates email messages were sent. A sender field 201, 301, 401 is a left hand vertical column showing senders of email messages. A subject field (i.e. free text field) 202, 302, 402, is a vertical column to the right of the sender column 201, 301, 401, and shows subjects or titles of email messages.

With reference now to FIG. 2, a prior art example of an email database with records sorted via a standard sort by a date field 200. Sorting an email database 200 in a date field 201 can be useful if a user wants to view all emails sent on a particular date. For example, a user may recall receiving one or more important emails on a certain date, but may not recall the sender of the email or what the subject of the email was. The user may also want to review all emails sent on a particular date, for example, if the user's business was affected in some way on a certain date, and the user wanted to investigate correspondence from that date. In FIG. 2, sender Clarice 204 sent an email message to the user notifying the user of missing supplier data in a Test Procedure Specification (TPS) report, as seen in the subject field title 205 corresponding to the email message from Clarice 204. The user may recall email correspondence regarding TPS reports on the date the user requests to have the records sorted.

By using the current art method of performing a standard sort to sort records of the email database 200 in the date field 201, the system sorts all email messages associated with a certain date and puts the emails from that date in order, as shown by the date field 201 in FIG. 2. The user can review all email messages regarding TPS reports sent on the date for which the user requested a sort function to sort. The user can also locate the specific email message from Clarice 204 having a subject line that reads "My TPS report is missing supplier data" 205. However, if the user received numerous email messages on the date for which the user requested the sort, the user would spend a great deal of time reviewing all of the email message results from the date field 201 sort. Further, if the user was incorrect about the date the user recalled the TPS report email messages, and the user requested the sort for the wrong date, sorting via a standard sort by the date field 201 could become not only cumbersome, but could result in the particular email message (i.e., the email message from Clarice 204) being impossible to locate.

FIG. 3 is a prior art example of an email database sorted via a standard sort by a sender field 300. Sorting an email database 300 by a sender field 301 allows a user to locate an email message from a particular sender. If the user recalls an email message from Clarice 304, but cannot recall the date the email message was sent or the exact subject of the email, the user can locate the email message from Clarice 304 by sorting the email database 300 by the sender field. The user may also want to review all email messages sent by Clarice 304, for example, before corresponding with Clarice 304 or meeting with Clarice 304 about a particular subject. However, if the user wants to locate one particular email message from Clarice 304, e.g. an email message regarding a TPS report that is missing supplier data, and there are numerous email messages from Clarice 304, the user could spend a considerable amount of time reviewing all the email messages from Clarice 304 before locating the particular email message the user wants to read.

FIG. 4 shows a prior art example of an email database sorted via a standard sort by a subject field 400. The subject field 402 is a free text field populated without any structure. Therefore, sorting the subject field 402 of an email database 400 using a current art method of a standard sort may not show off any useful patterns and may not be quite as useful. For example, in FIG. 4, the subject field 402 appears to be sorted alphabetically by a first word in the subject field 402. If the user wants to locate an email regarding TPS reports that are missing supplier data, the user may have difficulty locating the particular email message. In FIG. 4, such an email message was sent from Clarice 404, however the first word in the subject field is "My". A standard sort of the subject field 402 would not group all email messages regarding TPS reports together. In order to locate the email message from Clarice 404 regarding the TPS report, the user would have to read each email message subject or title line in the subject field 402. The user could skip down to email messages beginning with a "T" hoping to find all "TPS" email messages, but the email message from Clarice 404 would not be located with email messages having a subject or title line in the subject field 402 beginning with the letter "T". Using a current art standard sort for a subject field 402 of an email database 400 in this case would not improve the user's ability to locate the email message from Clarice 404 efficiently.

FIGS. 5 and 6 show an email database with records sorted based on free text field content, in accordance with embodiments of the present invention. In FIGS. 5 and 6, a date field 503, 603 is shown as a vertical column showing dates email messages were sent. A sender field 501, 601 is shown as a vertical column showing senders of email messages. A subject field (i.e. free text field) 502, 602 is located at the right of the sender column 501, 601, and shows subjects or titles of email messages.

FIG. 5 shows an example of an email database sorted by a subject field using new focus words produced by an analysis of free text field content 500. In order to sort records of the email database 500 based on content in a subject field 502 (i.e., free text field), a request is made to a sort function of a system to sort the free text field or subject field 502. The sort function request is intercepted by the system. The system calls out to a new routine for sorting content of a free text field or subject field 502. The content in the free text field or subject field 502 is analyzed by the new routine. The new routine analyzes the content in the free text field or subject field 502 by removing noise words, using existing clustering algorithms, using word frequency analysis, and/or using an analysis of word commonness or likelihood.

Using the results from the analysis, the system shifts a focus of a sorting algorithm from a first word in a sentence to a most frequent word, least frequent word, most common word, or the like. The sorting process can be performed in the corpus comprised of all records in the view, all records in the store, or any other permutation. The system can prepend an automatically generated cluster identification (ID), or the first non-noise word. New focus words 504 produced by the analysis are used to sort the free text field or subject field 502. The results of the record sorting are displayed to the user on a display.

In FIG. 5, the new focus words 506 (e.g., "coversheets", "dummy", "fixtures", "hates", "lunch", "manual", "Moly", "Nigerian", "Sonar", "supplier", "Websphere") have been highlighted according to a "least common for all records" algorithm, and alphabetically sorted based on the new focus words 506. The system may remove noise words from the viewer's display of the subject field 502. For example, the system may remove only noise words prior to a first non-noise word. The system may reorder the words in the viewer's display of the subject field 502.

In FIG. 5, if the user recalls an email message from Clarice 504 regarding a TPS report missing supplier data, and the user wants to locate the particular email message from Clarice 504, the user can easily locate the email message from Clarice 504 by having the system sort the records of the email database 500 based on free text field content using the "least common for all records" algorithm. There may be numerous email message subject or title lines containing the words "My", "TPS", "report", "is", "missing", "data", which are more common words. The user may recall supplier data being a subject of the email message from Clarice 504. The user can scroll within the subject field 502 results to the highlighted word "supplier" 507 to locate the email message from Clarice 504 having a subject field title 508 reading "My TPS report is missing supplier data", since "supplier" 507 is highlighted and alphabetized.

FIG. 6 shows an example of an email database sorted by a subject field using new primary focus words and new secondary focus words produced by an analysis of free text field content 600. In FIG. 6, the system has performed multiple passes of analysis to create new primary focus words 608 and new secondary focus words 609. The system sorts on both the new primary focus words 608 and new secondary focus words 609 using a same analysis, or using a different analysis. The results are displayed to a user with the new primary focus words 608 and new secondary focus words 609 highlighted.

In FIG. 6, the sorting results are alphabetized by sender where both the new primary focus word 608 and new secondary focus word 609 are present in a subject line. If only a new secondary focus word 609 appears in a subject field 602, the new secondary focus word 609 is highlighted, and alphabetized by sender beginning at the end of the results showing both the new primary focus word 608 and new secondary focus word 609. The new secondary focus word 609 is then and displayed to the user. For example, in FIG. 6, the new primary focus word 608 is "report" 610, and the new secondary focus word is "coversheets" 611. In an email message from Fred 612 the subject field 602 only references "coversheets" 611 and not "report coversheets" 610, 611. The new secondary focus word 609 "coversheets" 611 is highlighted and alphabetized after all results having both the new primary focus word 608 and new secondary focus word 609. The results of the free text field sorting are displayed to the user via a display. The system may also reorder the words in a viewer's display of the subject field 602 to a focus word.

Figure 7:
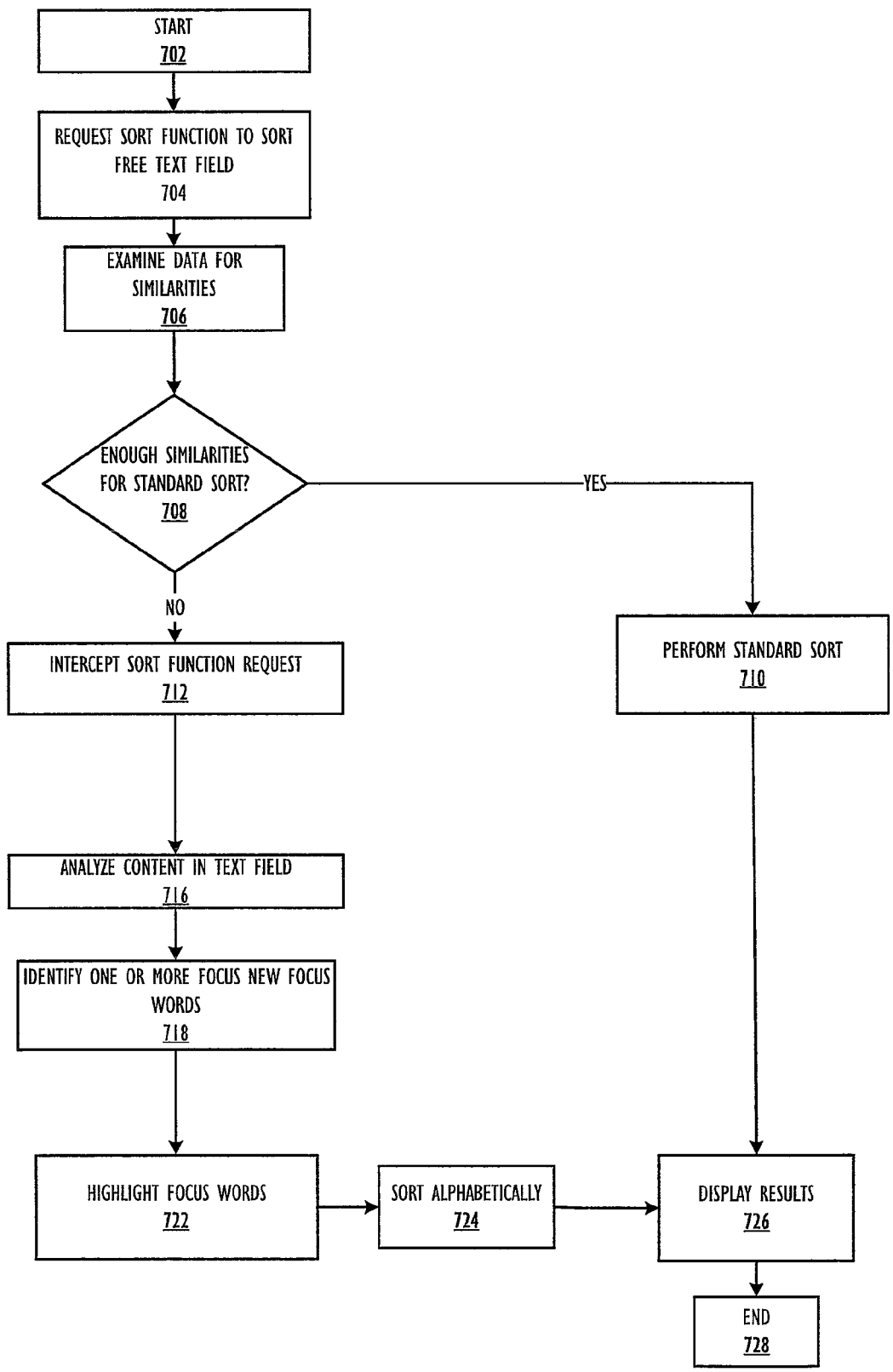
FIG. 7 is a flow chart of the process by which the features of the invention are implemented, according to one embodiment of the invention.

FIG. 7 is a flow chart illustrating one method by which the above process of the illustrative embodiments is completed. Although the method illustrated in FIG. 7 may be described with reference to components shown in FIG. 1, it should be understood that this is merely for convenience and alternative components and/or configurations thereof can be employed when implementing the method. Key portions of the method may be completed by SFTF utility 140 executing within DPS 100 (FIG. 1) and controlling specific operations of/on DPS 100, and the methods are thus described from the perspective of either/both SFTF utility 140 and DPS 100.

The process of FIG. 7 begins at initiator block 702 and proceeds to block 704, at which a request is received by a sort function to sort a free text field. The data in the free text field is examined for similarities, block 706, and a determination is made regarding whether enough similarities exist in the data of the free text field for a standard sort to be performed by the system, block 708. If enough similarities exist for a standard sort to be performed, a standard sort is performed in the free text field, block 710. The results of the sort are displayed to a user, block 726, and the process ends, block 728. If there are not enough similarities in the free text field data to perform a standard sort, the system intercepts the sort function request, block 712.

A new routine analyzes the content in the free text fields, block 716. The new routine can remove noise words, use existing clustering algorithms, use word frequency analysis, or use an analysis of word commonness or likelihood. Using the results produced by the analysis, the focus of the sorting algorithm is shifted from a first word in the sentence of a free text field. The focus can be shifted from a first word in the sentence to a most frequent word, a least frequent word, or a most common word. The sorting algorithm can sort in the corpus comprised of all records in a view, all records in a store, or any other permutation. The sorting algorithm can sort by prepending an automatically generated cluster identification (ID). The sorting algorithm can sort by the first non-noise word.

One or more new focus words are identified by the analysis to sort the free text field, block 718. The new focus words are highlighted, block 722, and sorted alphabetically, block 724. In one embodiment, noise words may be removed from the view's display of the field. The system may only remove noise words prior to the first non-noise word. The system may also reorder the words in the view's display of the free text field. Results are displayed to the user, block 726, and the process ends, block 728.

In an alternate embodiment, multiple passes of an analysis can be performed, as described above, and create new primary focus words and new secondary focus words. A free text field of a database is sorted using the new primary focus words and new secondary focus words. A same analysis can be used as previously instructed by a user for sorting a free text field. Alternatively, a different analysis may be used for sorting a free text field. The results are displayed, as described above. The results may be displayed by reordering the words in the view's display of the free text field to a particular focus word, (e.g., new primary focus word, or new secondary focus word).

In the flow chart above, one method is embodied in a computer readable medium containing computer readable code such that a series of steps are performed when the computer readable code is executed on a computing device. In some implementations, certain steps of the methods are combined, performed simultaneously or in a different order, or perhaps omitted, without deviating from the spirit and scope of the invention. Thus, while the method steps are described and illustrated in a particular sequence, use of a specific sequence of steps is not meant to imply any limitations on the invention. Changes may be made with regards to the sequence of steps without departing from the spirit or scope of the present invention. Use of a particular sequence is therefore, not to be taken in a limiting sense, and the scope of the present invention is defined only by the appended claims.

As will be further appreciated, the processes in embodiments of the present invention may be implemented using any combination of software, firmware or hardware. As a preparatory step to practicing the invention in software, the programming code (whether software or firmware) will typically be stored in one or more machine readable storage mediums such as fixed (hard) drives, diskettes, optical disks, magnetic tape, semiconductor memories such as ROMs, PROMs, etc., thereby making an article of manufacture in accordance with the invention. The article of manufacture containing the programming code is used by either executing the code directly from the storage device, by copying the code from the storage device into another storage device such as a hard disk, RAM, etc., or by transmitting the code for remote execution using transmission type media such as digital and analog communication links. The method of the invention may be practiced by combining one or more machine-readable storage devices containing the code according to the present invention with appropriate processing hardware to execute the code contained therein. An apparatus for practicing the invention could be one or more processing devices and storage systems containing or having network access to program(s) coded in accordance with the invention.

Thus, it is important that while an illustrative embodiment of the present invention is described in the context of a fully functional computer (server) system with installed (or executed) software, those skilled in the art will appreciate that the software aspects of an illustrative embodiment of the present invention are capable of being distributed as a program product in a variety of forms, and that an illustrative embodiment of the present invention applies equally regardless of the particular type of media used to actually carry out the distribution. By way of example, a non exclusive list of types of media includes recordable type (tangible) media such as floppy disks, thumb drives, hard disk drives, CD ROMs, DVDs, and transmission type media such as digital and analogue communication links.

While the invention has been described with reference to exemplary embodiments, it will be understood by those skilled in the art that various changes may be made and equivalents may be substituted for elements thereof without departing from the scope of the invention. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

What is claimed is:

1. A system for sorting records based on free text field content, comprising:
    a processor;
    a storage facility that stores free text field sorting results;
    a memory having stored thereon a utility which executes on the processor to provide the functions of:
        receiving a request by a sort function to sort a free text field;
        intercepting the sort function request;
        analyzing content in the free text field by:
            removing noise words; and
            sorting content of the free text field based on word frequency and word commonness;
        identifying one or more new focus words from results of said analyzing content in the free text field, wherein the new focus words are initially displayed in non-uniform positions within the free text field, and wherein the new focus words are identified by executing a clustering algorithm to identify significant words in said free text field;
        highlighting the new focus words;
        sorting the new focus words alphabetically; and
        displaying sorted free text field results based on the new focus words.

2. The system of claim 1, said utility further comprising executable code for:
    shifting a focus of a sorting algorithm from said word frequency and said word commonness to a least frequent word in the free text field.

3. The system of claim 2, said utility further comprising executable code for performing the sorting algorithm in one of:
    a corpus comprised of all records in a view of the free text field; and
    a corpus comprised of all records in a store of the free text field.

4. The system of claim 1, said utility further comprising executable code for:
    providing the new focus words to perform one or more of:
        removing noise words from a view's display of the free text field;
        removing only noise words prior to a first non-noise word from the view's display of the free text field; and
        reordering the words in the view's display of the free text field.

5. The system of claim 1, said utility further comprising executable code for:
   performing multiple passes of analysis to create new focus words; wherein the new focus words are new primary focus words and new secondary focus words; and
   sorting records based on the new primary focus words and the new secondary focus words, wherein said sorting sorts the new primary focus words before sorting said new secondary focus words.

6. The system of claim 1, wherein a most common word is a word that is most commonly used in a particular language in which the word is written.

7. The system of claim 1, wherein the free text field is a set of e-mail subject lines.

8. The system of claim 1, wherein said one or more new focus words are least frequently used words found in said free text field.

9. A method for sorting records based on free text field content, comprising:
   receiving a request by a sort function to sort a free text field;
   intercepting the sort function request;
   analyzing content in the free text field by:
      removing noise words; and
      sorting content of the free text field based on word frequency and word commonness;
   identifying one or more new focus words from results of said analyzing content in the free text field, wherein the new focus words are initially displayed in non-uniform positions within the free text field, and wherein the new focus words are identified by executing a clustering algorithm to identify significant words in said free text field;
   highlighting the new focus words;
   sorting the new focus words alphabetically; and
   displaying sorted free text field results based on the new focus words.

10. The method of claim 9, further comprising:
   shifting a focus of a sorting algorithm from said word frequency and said word commonness to a least frequent word in the free text field.

11. The method of claim 10, further comprising performing the sorting algorithm in one of:
   a corpus comprised of all records in a view of the free text field; and
   a corpus comprised of all records in a store of the free text field.

12. The method of claim 11, further comprising:
   providing the new focus words to perform one or more of:
      removing noise words from a view's display of the free text field;
      removing only noise words prior to a first non-noise word from the view's display of the free text field; and
      reordering the words in the view's display of the free text field.

13. The method of claim 9, further comprising:
   performing multiple passes of analysis to create new focus words; wherein the new focus words are new primary focus words and new secondary focus words; and
   sorting records based on the new primary focus words and the new secondary focus words, wherein said sorting sorts the new primary focus words before sorting said new secondary focus words.

14. A computer program product having code recorded on a computer readable storage medium for sorting records based on free text field content, said program product comprising code for:
   receiving a request by a sort function to sort a free text field;
   intercepting the sort function request;
   analyzing content in the free text field by:
      removing noise words; and
      sorting content of the free text field based on word frequency and word commonness;
   identifying one or more new focus words from results of said analyzing content in the free text field, wherein the new focus words are initially displayed in non-uniform positions within the free text field, and wherein the new focus words are identified by executing a clustering algorithm to identify significant words in said free text field;
   highlighting the new focus words;
   sorting the new focus words alphabetically; and
   displaying sorted free text field results based on the new focus words.

15. The computer program product of claim 14, further comprising code for:
   shifting a focus of a sorting algorithm from said word frequency and said word commonness to a least frequent word in the free text field; and
wherein said sorting is performed in one of:
   a corpus comprised of all records in a view of the free text field; and
   a corpus comprised of all records in a store of the free text field.

* * * * *